United States Patent
Mori et al.

(10) Patent No.: US 6,530,780 B2
(45) Date of Patent: Mar. 11, 2003

(54) CONTINUOUS SINTERING FURNACE AND USE THEREOF

(75) Inventors: Kazumi Mori, Koshigaya (JP); Toru Iura, Fujisawa (JP); Tetsuya Ishimoto, Yokohama (JP); Kazuhiko Katsumata, Saitama (JP); Hiroshi Machida, Yokohama (JP)

(73) Assignee: Ishikawajima-Harima Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/972,933

(22) Filed: Oct. 10, 2001

(65) Prior Publication Data

US 2002/0045144 A1 Apr. 18, 2002

(30) Foreign Application Priority Data

Oct. 10, 2000 (JP) .................... 2000-309146
Oct. 18, 2000 (JP) .................... 2000-317954

(51) Int. Cl.$^7$ ............................... F27D 3/04
(52) U.S. Cl. .................. 432/121; 432/126; 432/128
(58) Field of Search ................ 432/121, 122, 432/126, 128, 129, 146, 163

(56) References Cited

U.S. PATENT DOCUMENTS

| | | | | |
|---|---|---|---|---|
| 2,588,141 A | * | 3/1952 | McFarland et al. | 432/122 |
| 3,778,221 A | * | 12/1973 | Bloom | 432/122 |
| 4,397,451 A | | 8/1983 | Kinoshita et al. | |
| 4,627,814 A | * | 12/1986 | Hattori et al. | 432/128 |
| 4,932,864 A | * | 6/1990 | Miyabe | 432/128 |
| 5,044,944 A | * | 9/1991 | Furuya et al. | 432/128 |
| 5,128,286 A | | 7/1992 | Funayama et al. | |
| 5,443,383 A | * | 8/1995 | Kuehn | 432/122 |
| 5,997,286 A | | 12/1999 | Hemsath et al. | |

FOREIGN PATENT DOCUMENTS

| | | |
|---|---|---|
| DE | 44 20 464 | 12/1995 |
| JP | 9-222282 | 8/1997 |
| JP | 2000-55566 | 2/2000 |

OTHER PUBLICATIONS

Patent Abstracts of Japan, JP 06–323740, Nov. 25, 1994.
Patent Abstracts of Japan, JP 02–195194, Aug. 1, 1990.

* cited by examiner

*Primary Examiner*—Gregory Wilson
(74) *Attorney, Agent, or Firm*—Oblon, Spivak, McClelland, Maier & Neustadt, P.C.

(57) ABSTRACT

A continuous sintering furnace has an entrance-side deaerating chamber through which trays each with an material to be sintered being mounted thereon may pass, preheating, heating and cooling zones into which the trays are sequentially fed from the deaerating chamber, an exit-side deaerating chamber through which the trays having passed through the cooling zone may pass, a pusher for pushing the tray from the deaerating chamber to the preheating zone, a puller for pulling the tray from the cooling zone to the deaerating chamber, an intermediate puller for pulling the tray from the heating zone to the cooling zone, a vertically movable door between the deaerating chamber and the preheating zone, a vertically movable intermediate door adjacent to the door and arranged at an upstream end of the preheating zone in the direction of transportation of the trays, a vertically movable intermediate door between the heating and cooling zones and a vertically movable door between the cooling zone and the deaerating chamber. With the door being at a lowered position thereof for closing, heat input is suppressed to the cooling zone. Movement of the trays in the cooling zone is effected by the intermediate puller so as to decrease the number of trays needing to be pushed by the pusher.

7 Claims, 13 Drawing Sheets

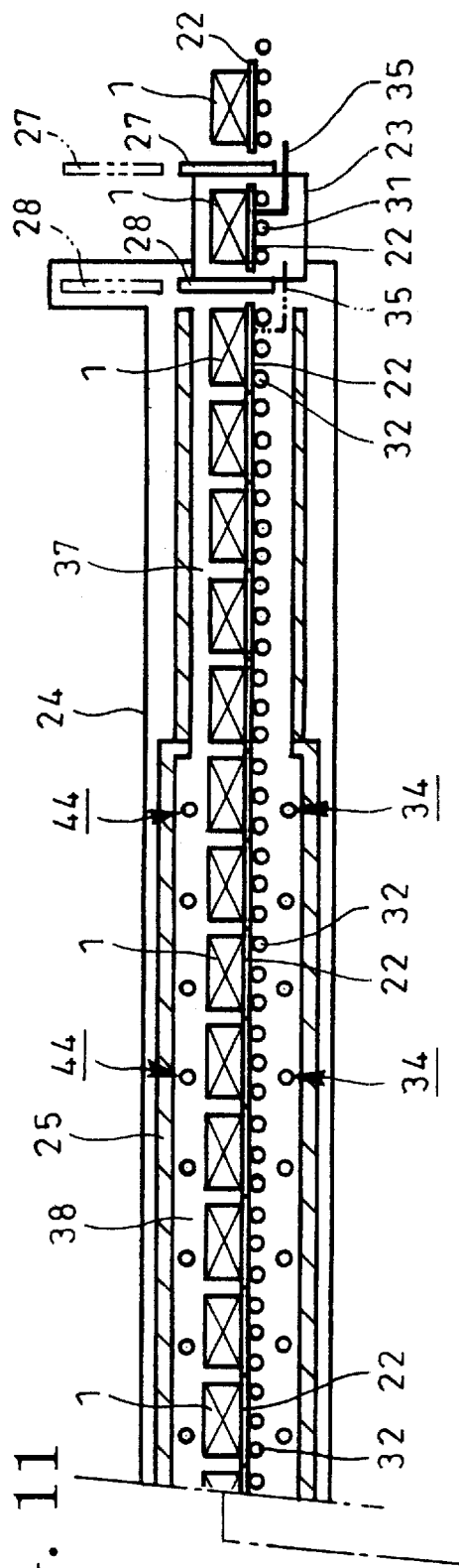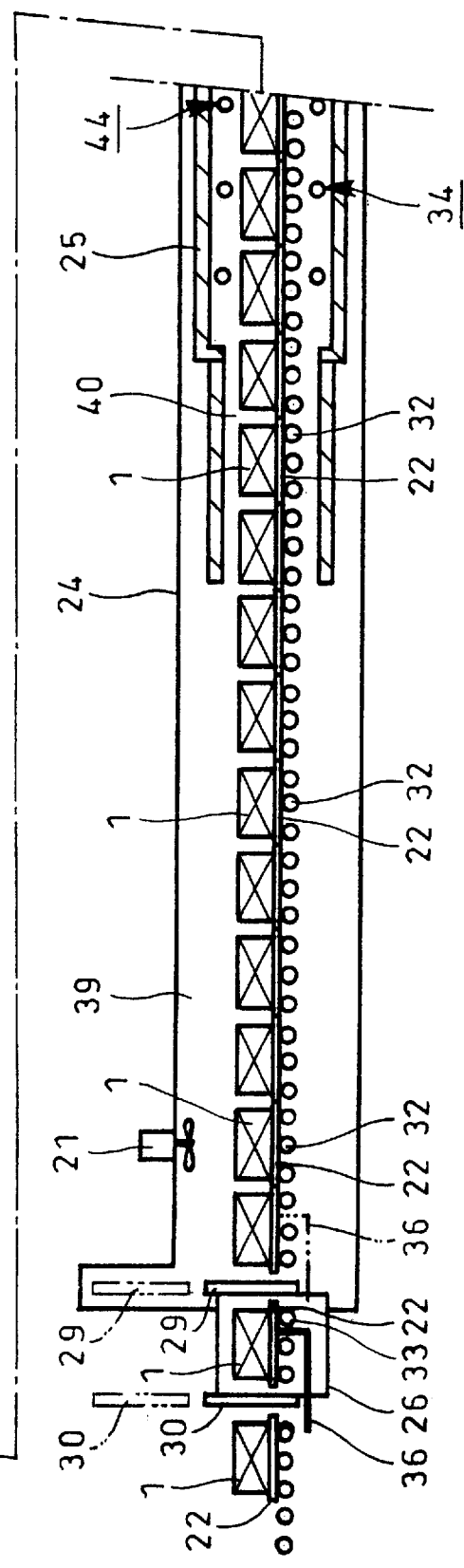
FIG. 11

CONTINUOUS SINTERING FURNACE AND USE THEREOF

BACKGROUND OF THE INVENTION

1. Field of the Invention

The present invention relates to a continuous sintering furnace and the method of use thereof. The continuous sintering furnace concerned is a sintering furnace for continuously sintering work or material to be sintered into ceramics. The works or materials to be sintered may be carbonic, nitric and oxide ceramics such as alumina ($Al_2O_3$), silicon carbide (SiO) and boron nitride (BN) and their treatment temperature maybe more than 1600° C. Structure, furnace material and the mechanisms needed are essential factors for such sintering furnace being operated continuously at high temperature. Usually graphite is used as furnace material because of its excellence in heat resistance, which may bring about considerable restrictions in the structure and mechanisms needed because of its physicality.

2. Discussion of the Background

FIGS. 1 and 2 show a conventional continuous sintering furnace comprising an entrance-side deaerating chamber 3 through which trays 2 each with a work or material 1 to be sintered being mounted thereon may pass, a furnace body 5 which is arranged in a chamber 4 contiguous with said deaerating chamber 3 and into which the trays 2 are sequentially fed in a line or column and an exit-side deaerating chamber 6 which is contiguous with said chamber 4 and through which the trays 2 having passed through the furnace body 5 may pass.

A space between an inner face of the chamber 4 and an outer face of the furnace body 5 is filled with heat insulating material (not shown). A double-walled cooling structure is applied to the chamber 4.

The deaerating chamber 3 is provided with vertically movable doors 7 and 8 at its upstream and downstream ends in a direction of transportation of the trays 2, respectively. Likewise, the deaerating chamber 6 is provided with vertically movable doors 9 and 10 at its upstream and downstream ends in the direction of transportation of the trays 2, respectively.

With the doors 7, 8, 9 and 10 being closed into their lowered positions, air-tightness is maintained in the chambers 3, 4 and 6. With the doors 7, 8, 9 and 10 being opened into their raised positions, the trays 2 are allowed to pass through the chambers 3, 4 and 6.

In the chambers 3, 4 and 6 and along substantially the entire length thereof, pairs of laterally spaced skid beams 11, 12 and 13 are provided to slidably support the trays 2 from below, respectively.

A plurality of vertically extending heaters 14 are disposed in a longitudinally intermediate portion of the furnace body 5 such that the heaters 14 are positioned laterally of the material 1 to be sintered on the tray 2. The material 1 to be sintered is heated by the heaters 14.

The continuous sintering furnace is also equipped with a pusher 15 which pushes the trays 2 one by one into the furnace body 5 from the deaerating chamber 3 as well as a puller 16 which pulls the trays 2 one by one from the furnace body 5 to the deaerating chamber 6.

Upon starting of an operation of the continuous sintering furnace, the furnace body 5 is filled with non-oxidizing gas with the doors 8 and 9 being closed. Then, the heaters 14 are activated to heat the inside of the furnace body 5 to a predetermined temperature.

Next, the tray 2 on which the material 1 to be sintered is mounted is fed to the deaerating chamber 3; and the door 7 is closed and air inside the chamber 3 is discharged. Then, the door 8 is opened and the tray 2 is pushed into the furnace body 5 by the pusher 15; and the door 8 is closed again.

After the lapse of a predetermined time period, another tray 2 is pushed from the deaerating chamber 3 into the furnace body 5 according to the procedure described above to thereby push the tray or trays 2 already in the latter toward the deaerating chamber 6.

Repetition of the procedure described above causes the tray 2 to reach the most downstream position in the furnace body 5. Then, the door 9 is opened with the door 10 being closed; and the tray 2 is pulled by a puller 16 from the furnace body 5 into the deaerating chamber 6. After closing the door 9, the door 10 is opened to take the tray 2 to outside.

Thus, the material 1 is gradually raised in temperature for a predetermined time period in a preheating zone 17 in the furnace body 5 adjacent to the deaerating chamber 3, is heated to a constant temperature for a predetermined time period in a heating zone 18 at the intermediate portion in the furnace body 5 and is gradually cooled for a predetermined time period in a gradual cooling zone 19 in the furnace body 5 adjacent to the deaerating chamber 6.

In the continuous sintering furnace constructed as described above and when the amount of production is to be increased without changing a cross sectional area of the furnace, the heating zone 18 is prolonged in length and movement of the tray 2 is increased in speed.

When a variety of products are required to be produced for small quantities, the heating zone 18 is shortened in length and movement of the tray 2 is decreased in speed so as to reduce the number of production lots.

The continuous sintering furnace shown in FIGS. 1 and 2 may be suitable for a single product with a certain degree of large-scale production. However, in multiple products with small-scale production in which the heating zone 18 is shortened in length and movement of the tray 2 is decreased in speed, tact time of the material 1 becomes longer so that thermal loss in the heating zone 18 increases, resulting in heat input to the gradual cooling zone 19. Consequently, the gradually cooling zone 19 must be prolonged in length so as to secure sufficient cooling time for the work or material 1.

Use of different process gases in the heating zone 18 and gradually cooling zone 19 would result in mixture of the two gases since the zones 18 and 19 are always in communication with each other.

An intermediate door cannot be provided between the zones 18 and 19 for avoidance of such mixture of the two gases since the construction is such that the tray 2 pushed into the zone 17 pushes the tray or trays 2 already in the zones 17, 18 and 19 downstream in the direction of transportation.

A furnace floor structure is provided by skid beams 12; there is high sliding friction coefficient between the tray 2 and the skid beams 12, resulting in an increase of thrust of the pusher 15 and pushing force between the trays 2. Therefore, when number of trays 2 used is increased, then upper faces of the skid beams 12 constituting a transportation path of the trays 2 may be deformed in a wave shape or formed with steps, with the disadvantageous result that the column of trays 2 on the skid beams 12 are not smoothly slid and may lift up like a bridge as shown in FIG. 3 leading to failure of transportation of the trays.

If push-in load for the column of trays 2 applied by the pusher 15 is increased in this state, then the trays 2 may jump upwardly and buckle.

Furthermore, the amount of input heat conducted to the material 1 via the trays 2 from below is inevitably less than that conducted from above or from each side since, with the trays 2 being supported by the skid beams 12 longitudinally running through the furnace body 5, the material 1 is heated by the heaters 14 at opposite sides of the path of transportation of the trays 2 so that heating of the material 1 may be insufficient at its lower portion, thereby decreasing production yields.

Heat treatment time period for ceramics are generally predetermined. Therefore, in order to increase the amount of production, the length of the furnace must be prolonged and transportation speed (tact) of the trays must be increased, which will thus cause an increase in the number of trays 2 in the furnace. The skid-type transportation mechanism is low in transportation limit, resulting in restriction in number of trays 2 in the furnace.

Generally speaking, installation and running costs are lowered as the amount of production is increased. The transportation limit may be a restriction with respect to cost.

An increase in friction force will cause an increase in horizontal force generated in the furnace floor, resulting in the necessity of an increase in size of the furnace floor structure. Overcoming this problem by changing the furnace material is difficult to attain since there is no effective material other than graphite as to a high-temperature furnace. An increase in size of the furnace floor structure will eventually result in the deterioration of uniformity of heat above and below the material to be sintered, leading to poor yields. In other words, the area of the effective zone for sintering is decreased in the furnace, thereby lowering the amount of production. This means a decrease in heating efficiency of the furnace and an increase in installation and running costs.

An increase in friction force will also accelerate wear between the tray 2 and the skids 12. This causes a deviation of the levels of the skids 12 and the levels of the trays 2, leading to lift-up of a bridge. As a result, transportation limit of the trays may be generated due to aging, which may make it difficult to effect stable operation.

The heaters 14 extend vertically and are arranged laterally of the trays. In a high-temperature furnace, the heaters 14 may reach temperatures of more than 2,000° C. so that the electrodes used need to be water-cooled. In order to absorb heat expansion of the heaters 14 themselves (e.g., 10 mm or more for 1 m of heater), the heaters 14 are fixed at a top portion thereof and are free at their lower ends. In order to attain uniformity of heat, heat loss at the furnace floor must be compensated. However, in the case of such lateral arrangement of the heaters 14, vertical heat input cannot be controlled. To this end, the furnace height may be increased over and above what is needed, prolonging the heater length. However, then vertical heat input is fixed. Moreover, to increase in size of the furnace over and above what is needed may result in decrease of heating efficiency and increase in installation and running costs.

In view of the foregoing, the invention has as one of its objects to provide a continuous sintering furnace and use thereof which can enhance energy efficiency of the furnace as a whole and ensure transportation of trays.

SUMMARY OF THE INVENTION

In order to attain the above-mentioned object, a continuous sintering furnace according to the present invention comprises an entrance-side deaerating chamber through which trays each with a material to be sintered being mounted thereon may pass, preheating, heating and cooling zones into which the trays are sequentially fed from said entrance-side deaerating chamber, an exit-side deaerating chamber through which the trays having passed through the cooling zone may pass, a pusher for pushing the tray from the entrance-side deaerating chamber to the preheating zone, a puller for pulling the tray from the cooling zone to the exit-side deaerating chamber, an intermediate puller for pulling the tray from the heating zone to the cooling zone, a vertically movable first door between the entrance-side deaerating chamber and the preheating zone, a vertically movable first intermediate door adjacent to said first door and arranged at an upstream end of the preheating zone in the direction of transportation of the trays, a vertically movable second intermediate door between the heating and cooling zones and a vertically movable second door between the cooling zone and the exit-side deaerating chamber.

In a continuous sintering furnace according to the claimed invention, a number of free rollers for supporting the trays from below are arranged over whole lengths of the preheating, heating and cooling zones.

A continuous sintering furnace according to the present invention comprises a substantially horizontally arranged furnace body through which a plurality of trays each with a material to be sintered being mounted thereon may pass from one end to the other end of the furnace body, a number of free rollers for supporting the trays from below which are arranged in a spaced apart relationship over whole length of said furnace body, a plurality of lower heaters arranged over a predetermined range in the furnace body so as to be positioned below and between the free rollers and a plurality of upper heaters arranged over the predetermined range in the furnace body so as to be positioned above a path of transportation of the trays.

In a continuous sintering furnace according to the invention, in addition to the constructions of the continuous sintering furnace according to the claimed invention, the free rollers are arranged in a plurality of columns along the length of the furnace body.

In a continuous sintering furnace according to the present invention, in addition to the constructions of the continuous sintering furnace according to the claimed invention, the lower and upper heaters extend horizontally and laterally of the trays and are arranged symmetrically with respect to the path of transportation of the trays.

In a continuous sintering furnace according to the claimed invention, in addition to the constructions of the continuous sintering furnace according to the present invention, each of the lower and upper heaters comprises a heating energization body which extends through side walls of the furnace body substantially horizontally and laterally of the trays, and holders which support electrodes on opposite ends of the heating energization body.

In a continuous sintering furnace further according to the claimed invention, when the continuous sintering furnace is used, a push-in load of the pusher at which the column of trays pushed downstream in the direction of transportation lift up in a bridge shape is preliminarily grasped as a push interrupt load wherein if the push-in load of the pusher reaches said push interrupt load upon pushing of the trays downstream in the direction of transportation, the operation of the pusher is temporarily interrupted and the lift-up of the column of trays is eliminated, and then the trays 22 are pushed again.

In the continuous sintering furnaces also according to the present invention, the trays are pulled one by one from the heating zone to the cooling zone by the intermediate puller; and, with the second intermediate door being at its lowered position for closing, heat input to the cooling chamber is suppressed.

In the continuous sintering furnace further according to the claimed invention, a number of free rollers disposed in the preheating, heating and cooling zones support the trays, thereby facilitating the transportation of the trays.

In the continuous sintering furnaces claimed, radiant heat energy from the upper heaters is conducted to the material to be sintered from above, and radiant heat energy from the lower heaters is conducted to the material to be sintered from below through clearances between the free rollers and via the trays so that the material to be sintered are heated.

The arrangement of the heaters so as to be above and below the material to be sintered can vary input heat vertically. The furnace floor receives a load of the material to be sintered and in contact with the furnace body which is at low temperature so that inevitably thermal loss will generate and the work or material has temperature distribution or deviation, which will be compensated by heat input of the horizontal heaters arranged above and blow the material to be heated.

In a high-temperature furnace, the horizontal heaters must absorb thermal expansion of the heaters themselves and thermal expansion of the heating zone in the directions longitudinally and laterally of the furnace. Actually, the furnace body has weld structures of iron and therefore has manufacturing tolerances. These problems are solved by a one-point support mechanism using O-rings at opposite ends of the heater (mechanism which supports each end of the heater at a point and which receives thermal expansion of the heater). This can absorb the thermal expansions of the heater and heating zone and the manufacturing tolerances of the furnace body.

In the continuous sintering furnace according to claim 4, the trays are supported by the free rollers arranged in a plurality of columns along the length of the furnace body, thereby improving the conductive efficiency of radiant heat energy from the lower heaters to the materials to be sintered.

In comparison with the skid beam system, the free roller system reduces the friction between tray and free rollers so as to be about one tenth as much as that of the skid beam system. As a result, the following advantages are obtained:

1. A decrease in friction force will cause a decrease in thrust of the pusher, leading to a decrease in internal force between the adjacent trays, which will improve the transportation limit and increase the number of trays transportable in the furnace and the amount of production. Experiments revealed that lift-up of a bridge of trays is a function of the horizontal level of trays (level of furnace floor) and internal force between the adjacent trays and that the internal force between the adjacent trays is substantially in proportion to transportation limit. Therefore, the transportation limit is increased by substantially ten times.
2. The frictional force provides a horizontal force in the furnace floor so that decrease in friction force will make it possible to decrease in size of furnace floor structure. In a high-temperature furnace, which has restriction in selection of material, such decrease in friction force is extremely effective means for making the furnace floor smaller-sized. Because of the furnace floor being smaller-sized, the effective space in the furnace is increased. In a high-temperature furnace, in which radiation of the heaters is dominant in heating of the material to be sintered, such increase in space results in an increase in heating efficiency. As to thermal loss of the furnace floor, which is dependent upon area thereof in the furnace body, a decrease in horizontal force leads to decrease in number of furnace floor support pillars, whereby the thermal loss can be decreased.

Thermal uniformity of the work or material is dependent upon balance of thermal loss. Decrease in thermal loss on the furnace floor is effective to this, leading to improvement of thermal uniformity. This will increase the effective zone, leading to improvement of production yields, which in turn results in decrease in installation and running costs.

3. Because of the furnace floor being smaller-sized, the effective space is increased, which enables an arrangement of effective horizontal heaters. The heater structure sandwiching the material to be sintered from above and below can compensate thermal loss of the furnace floor.
4. The decrease in friction force leads to decrease in wear between the trays and rollers. This will decrease variation of the furnace floor level due to wear. As a result, lift-up of a bridge is suppressed, the operation of the furnace is stabilized and maintenance intervals are prolonged.

In the continuous sintering furnace according to claim 5, the lower and upper heaters are arranged substantially horizontally and laterally of the trays and symmetrically with respect to the path of transportation of the trays, thereby making temperature distribution in the materials to be heated in its lateral direction uniform.

In the continuous sintering furnace according to the claimed invention, the heating energization body extends through the side walls of the furnace body, and the electrodes at the opposite ends of the energization body are displaceably supported by the holders, so that the difference in thermal expansion between the heating energization body and the furnace body is absorbed.

In use of a continuous sintering furnace according to the claimed invention, heat input to the cooling chamber is suppressed such that the trays are moved from the heating zone to the cooling chamber by the intermediate puller and the intermediate door can be closed into its lowered position.

In use of a continuous sintering furnace according to the present invention, whether or not the column of trays lift up is judged based on whether or not the push-in load of the pusher has reached the push interrupt load preliminarily grasped. If the push-in load of the pusher has reached the push interrupt load, the operation of the pusher is temporary interrupted and the lift-up of the column of trays is eliminated. Conditions of the column of trays where the lift-up occurred may be changed to advance the column of the trays depending upon the push-in load of the pusher.

BRIEF DESCRIPTION OF THE DRAWINGS

FIG. 11 is a longitudinal section generally and schematically showing a second embodiment of the invention;

DESCRIPTION OF THE PREFERRED EMBODIMENTS

A continuous sintering furnace according to the invention is preferably used for a sintering temperature range of 1600° C. to 2500° C.

Figure 1:
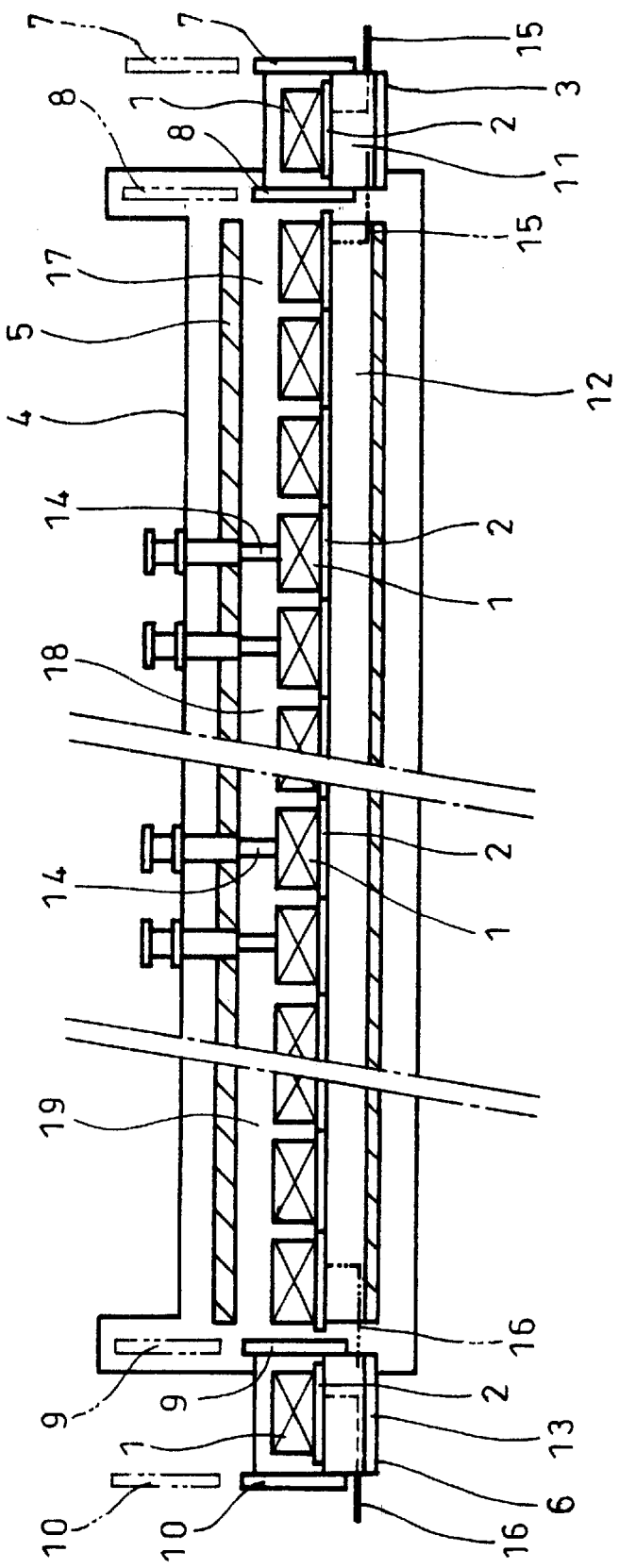
FIG. 1 is a longitudinal section generally and schematically showing a conventional continuous sintering furnace.
Figure 2:
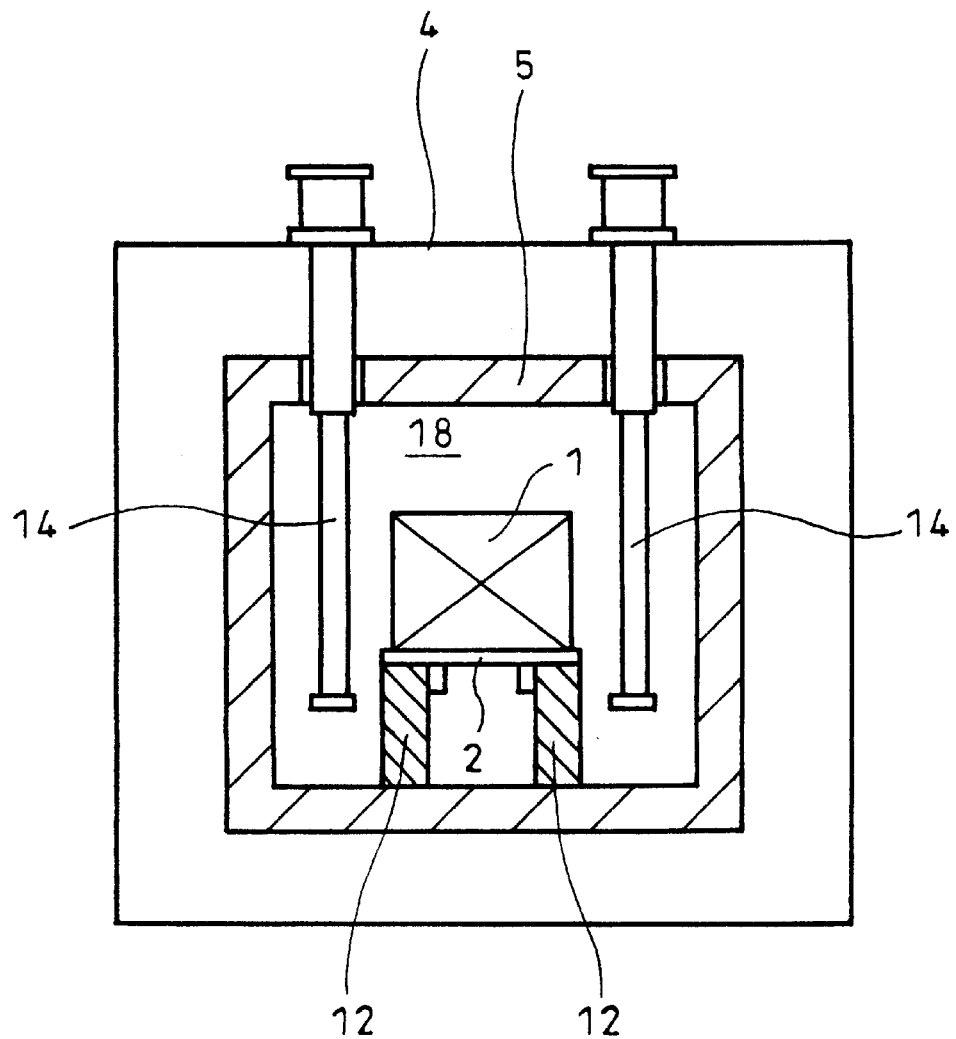
FIG. 2 is a transverse section schematically showing the furnace body in FIG. 1.
Figure 3:
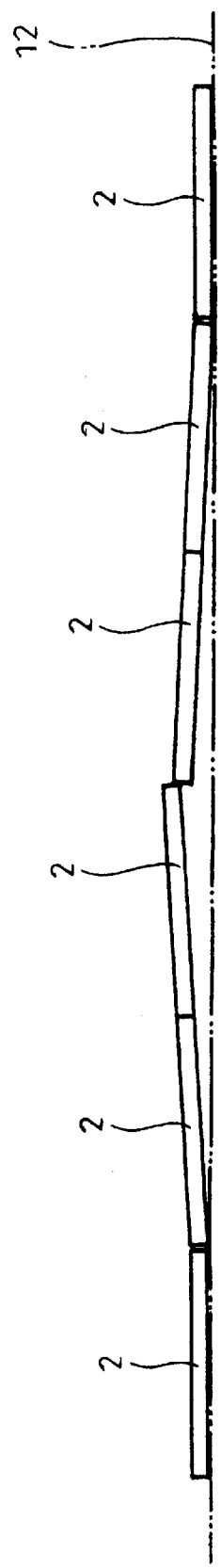
FIG. 3 is a side view schematically showing the column of trays in FIG. 1 lifting up in a bridge shape.
Figure 4:
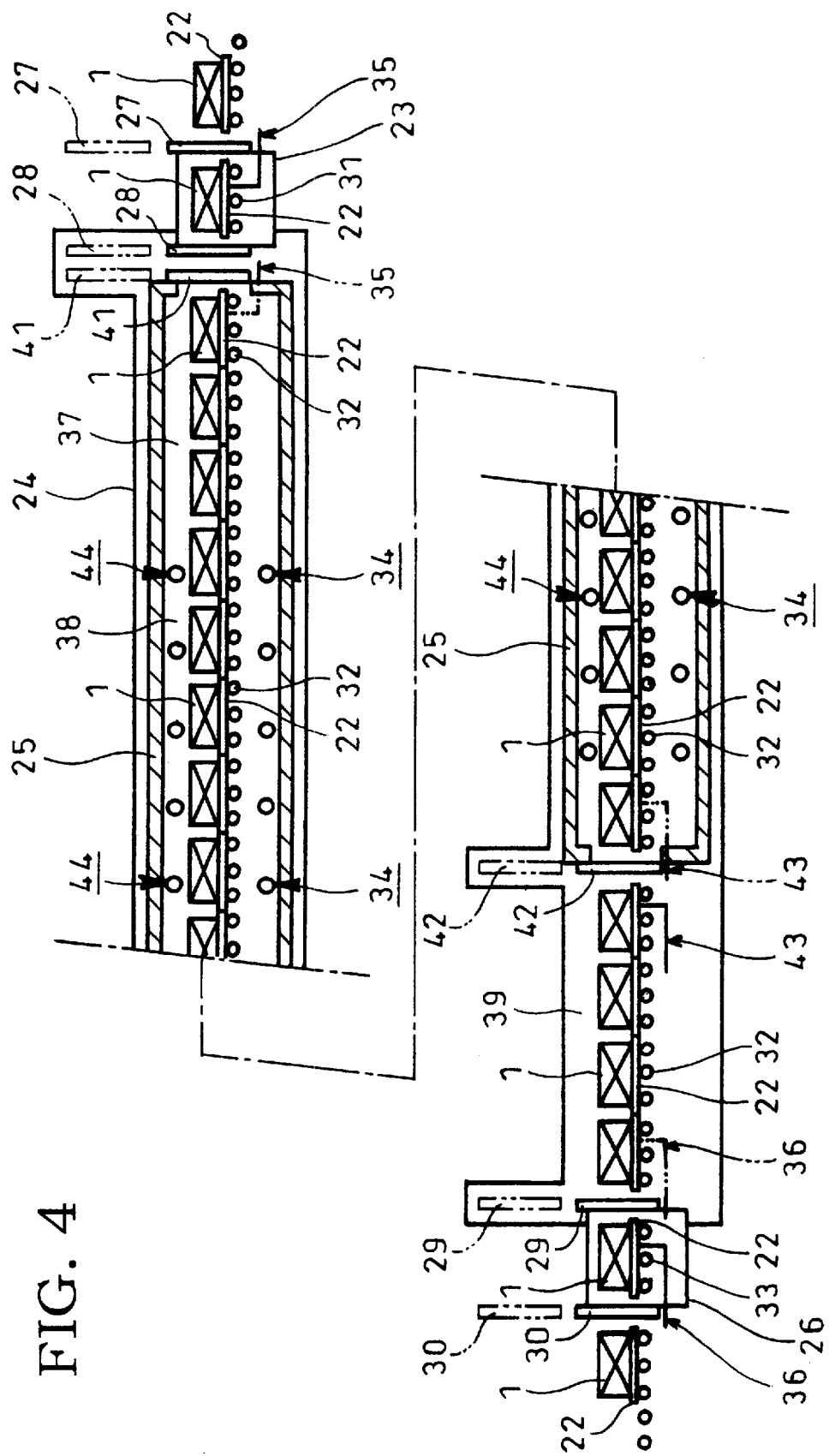
FIG. 4 is a longitudinal section generally and schematically showing a first embodiment of the invention.
Figure 5:
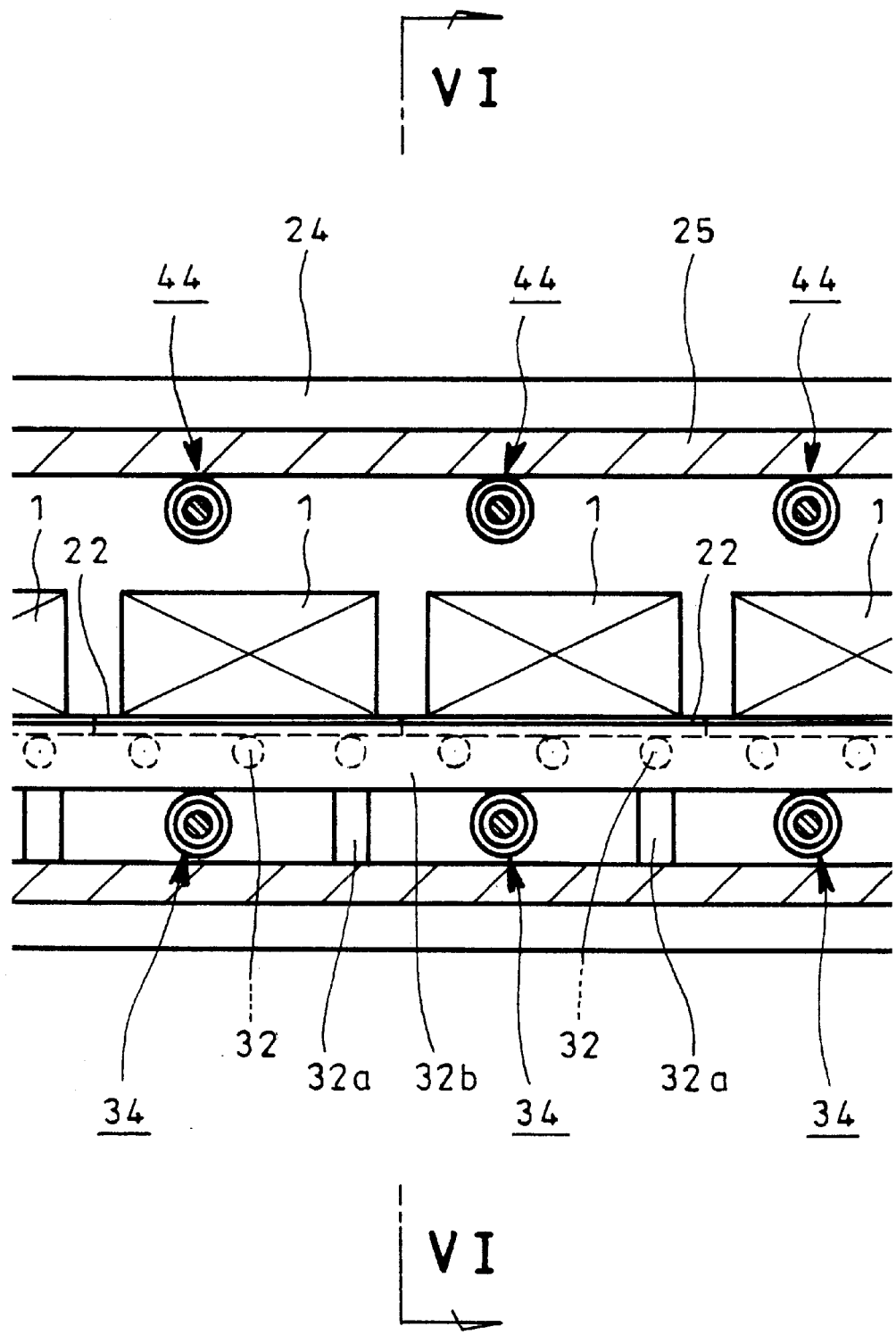
FIG. 5 is a longitudinal fragmentary section schematically showing the furnace body in FIG. 4.
Figure 6:
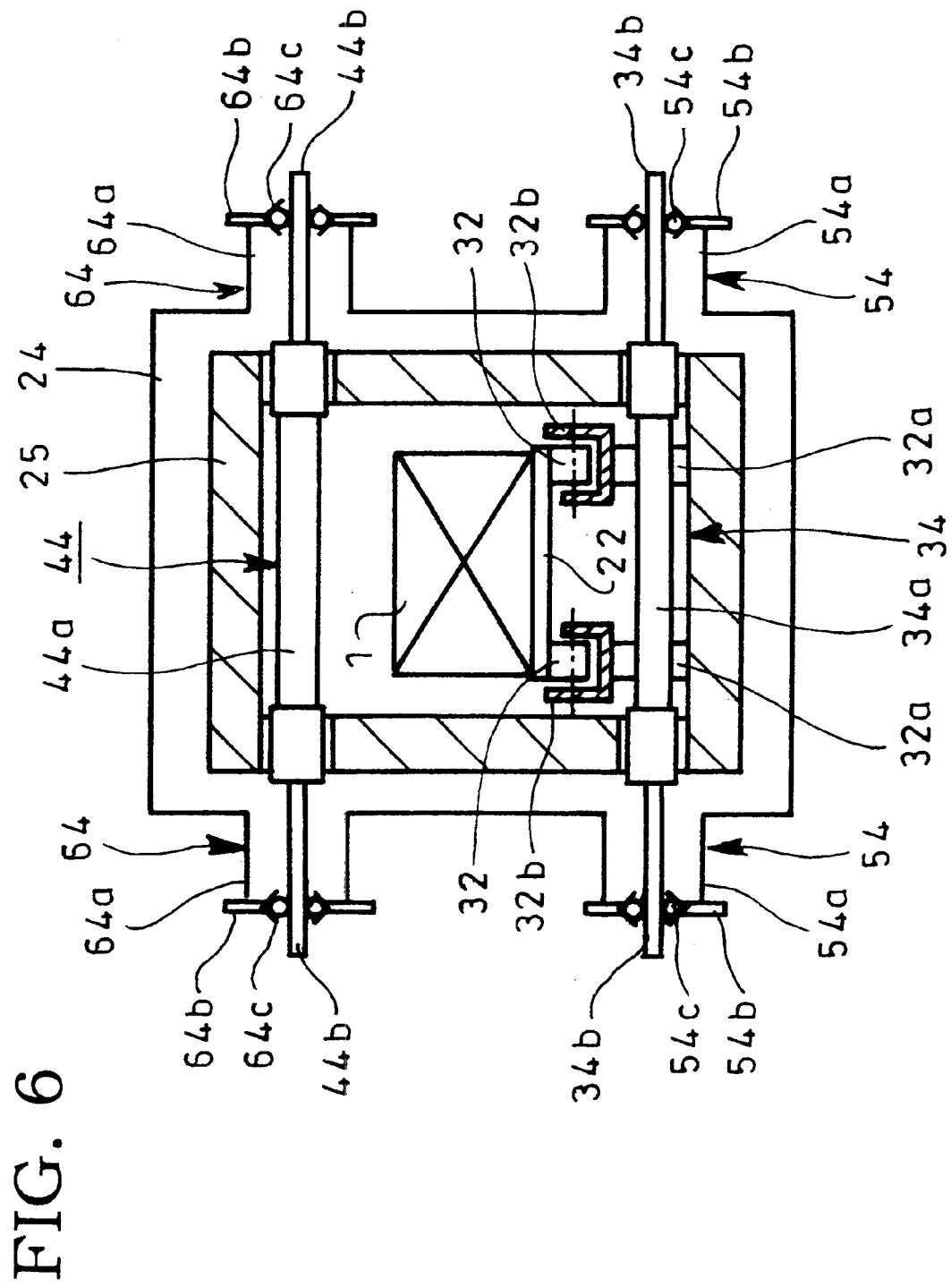
FIG. 6 is a view looking in the direction of arrows VI in FIG. 5.
Figure 7:
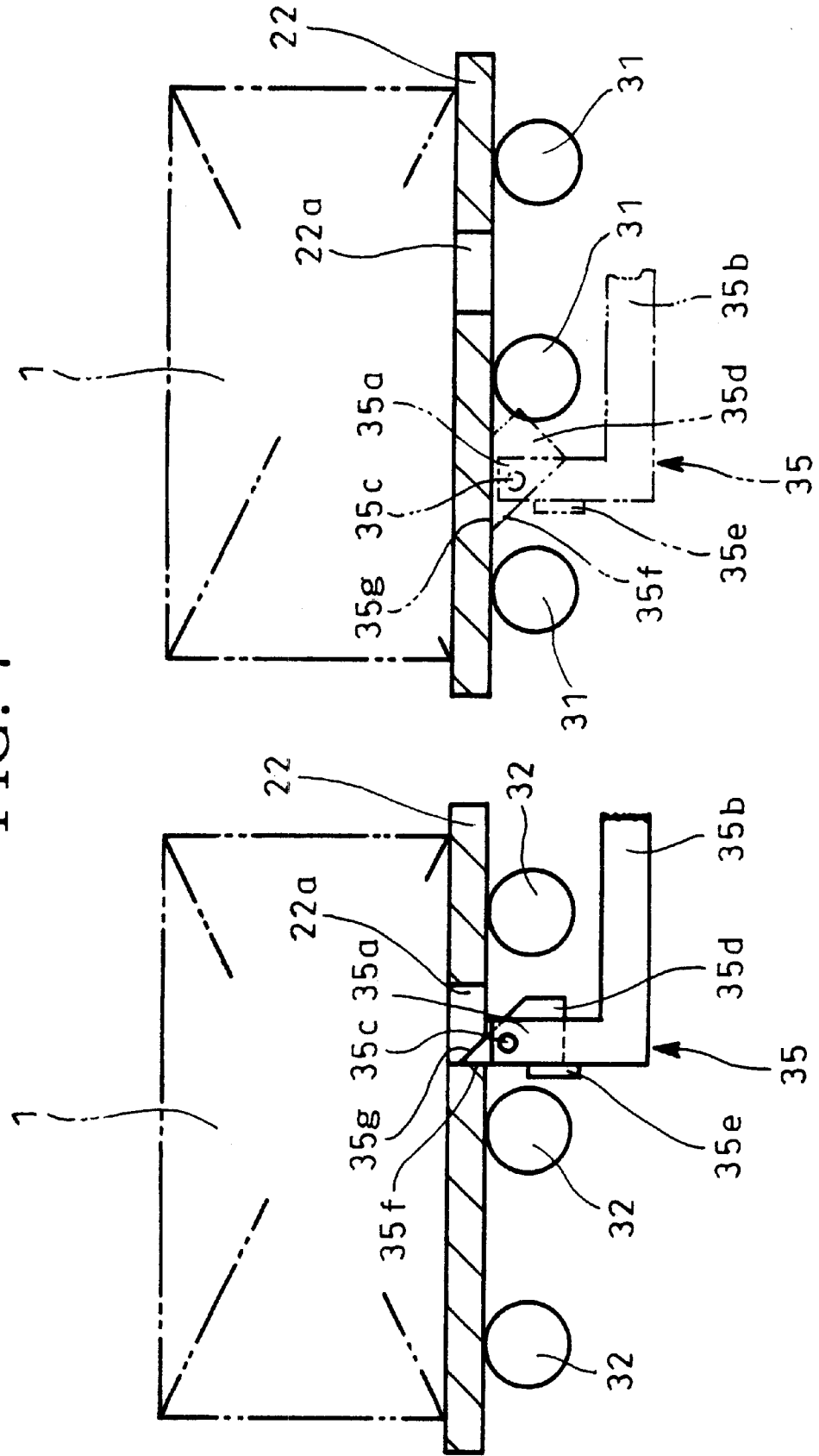
FIG. 7 is a side view schematically showing the construction of the pusher in FIG. 4.
Figure 8:
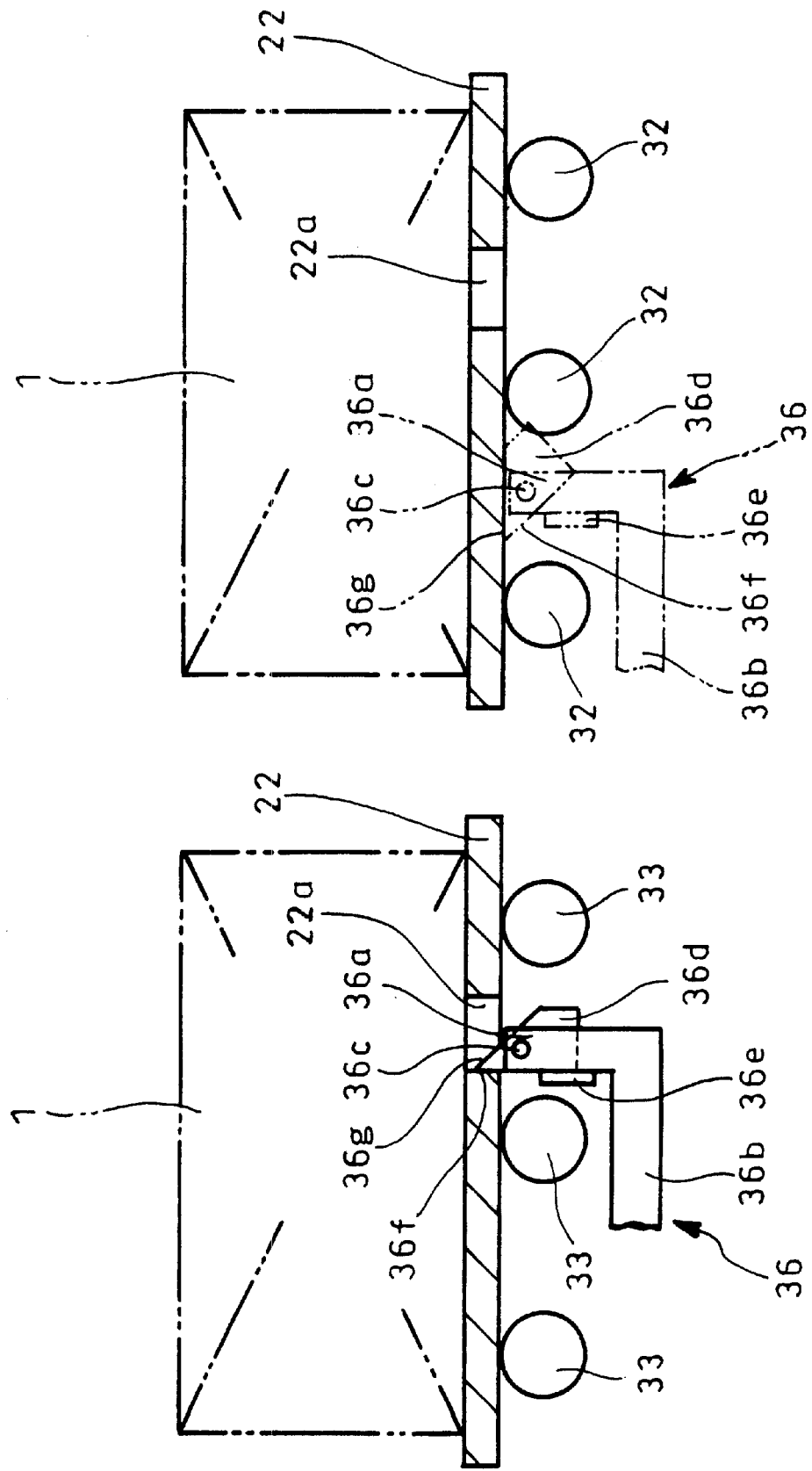
FIG. 8 is a side view schematically showing the construction of the puller in FIG. 4.
Figure 9:
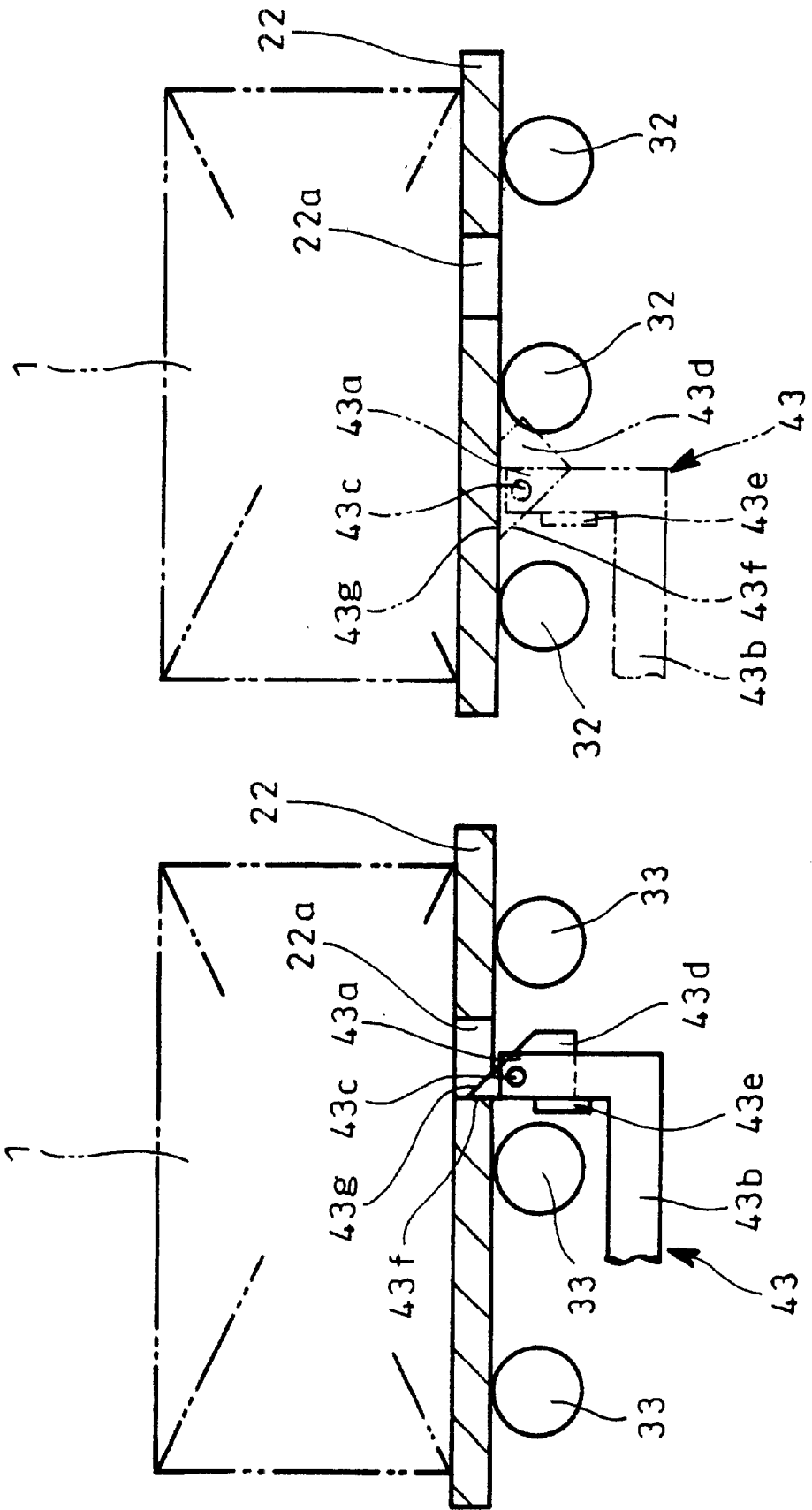
FIG. 9 is a side view schematically showing the construction of the intermediate puller in FIG. 4.

FIGS. 4 to 9 show a first embodiment of a continuous sintering furnace according to the invention. In the figures, parts which are identical to those in FIGS. 1 and 2 are given the same reference numerals.

The continuous sintering furnace comprises an entrance-side deaerating chamber 23 through which trays 22 each with a work or material 1 to be sintered being mounted thereon may pass, a chamber 24 contiguous with the chamber 23, a furnace body 25 which is arranged in the chamber 24 and into which the trays 22 are fed sequentially in a column from the entrance-side deaerating chamber 23, an exit-side deaerating chamber 26 which is contiguous with said chamber 24 and through which the trays 22 having passed through the furnace body 25 may pass, a number of free rollers 32 arranged along substantially the entire length of the furnace body 25 and along a portion of the chamber 24 adjacent to its downstream end so as to contact lower faces of and support the trays 22, a plurality of lower heaters 34 disposed over a predetermined range in the furnace body 25 so as to be positioned below and between the free rollers 32 and a plurality of upper heaters 44 disposed over the predetermined range in the furnace body 25 so as to be positioned above a path of transportation of the materials 1.

The space between an inner face of the chamber 24 and an outer face of the furnace body 25 is filled with heat insulating material (not shown). A double-walled cooling structure is applied to the chamber 24.

The furnace body 25 has an entrance end for the materials 1 to be sintered adjacent to the chamber 23, an exit end for the materials 1 spaced apart from the chamber 26 and a cooling chamber 39 between the exit end and the chamber 26.

The furnace body 25 is made of graphite, which is excellent in heat resistance.

The entrance and exit ends of the furnace body 25 are provided with vertically movable intermediate doors 41 and 42 having gas-tight structures, respectively.

With the intermediate doors 41 and 42 being closed into their lowered positions, the furnace body 25 is in a state in which thermal loss is suppressed; with the intermediate doors 41 and 42 being opened into their raised positions, the trays 22 are allowed to pass through the furnace body 25.

The chamber 23 is provided with vertically movable doors 27 and 28 at its upstream and downstream ends in the direction of transportation of the trays 22, respectively. Likewise, the chamber 26 is provided with vertically movable doors 29 and 30 at its upstream and downstream ends in the direction of transportation of the trays 22, respectively.

With the doors 27, 28, 29 and 30 being closed into their lowered positions, air-tightness is maintained in the chambers 23, 24 and 26. With the doors 27, 28, 29 and 30 being opened into their raised positions, the trays 22 are allowed to pass through the chambers 23, 24 and 26.

The free rollers 32 are supported by brackets 32b on upper ends of support pillars 32a on a bottom of the furnace body 25 and the like.

The free rollers 32 are disposed in two columns along the length of the furnace body 25 so as to contact laterally opposite ends of a lower face of each tray 22.

In the deaerating chambers 23 and 26, free rollers 31 and 33 having the same support structures as those of the roller 32 are disposed to contact the lower face of the tray 22, respectively.

The lower and upper heaters 34 and 44 are disposed within the furnace body 25 excluding a preheating zone 37 or a portion adjacent to the chamber 23 to form a heating zone 38. The materials 1 to be sintered are heated by energizing the heaters 34 and 44.

The lower heater 34 comprises a heating energization body 34a which extends through side walls of the furnace body 25 substantially horizontally and laterally of the tray 22, and holders 54 which support electrodes 34b on opposite ends of the body 34a. Likewise, the upper heater 44 comprises a heating energization body 44a which extends through the side walls of the furnace body 25 substantially horizontally and laterally of the tray 22, and holders 64 which support electrodes 44b on opposite ends of the body 44a.

Each of the heating bodies 34a and 44a is made of graphite, which has excellent heat resistance.

Each of the electrodes 34b and 44b is made of copper and has an inner flow passage (not shown) to which cooling water is continuously supplied.

The holder 54 comprises a support tube 54a arranged on a side wall of the chamber 24 so as to communicate with inward side of the wall, an annular support seat 54b fastened to an end of the support tube 54a to circumferentially surround the electrode 34b and a seal ring 54c between the support seat 54b and the electrode 34b so that the latter is allowed to swing around the seal ring 54c. Likewise, the holder 64 comprises a support tube 64a arranged on a side wall of the chamber 24 so as to communicate with inside of the wall, an annular support seat 64b fastened to an end of the support tube 64a to circumferentially surround the electrode 64b and a seal ring 64c between the support seat 64b and the electrode 64b so that the latter is allowed to swing around the seal ring 64c.

Furthermore, the continuous sintering furnace is equipped with a pusher 35 which pushes the trays 22 one by one into the preheating zone 37 from the deaerating chamber 23, a puller 36 which pulls the trays 22 one by one from the cooling zone 39 to the deaerating chamber 26 and an intermediate puller 43 which pulls the trays 22 one by one from the heating zone 38 to the cooling zone 39.

The pusher 35 comprises an arm 35b with an upwardly projecting support 35a and movable forwardly and backwardly in parallel with the path of transportation of the trays 22, a dog 35d pivoted to the support 35a via a pin 35c extending horizontally and laterally of the trays 22 and a stop 35e fixed to the support 35a so as to limit the pivotal movement of the dog 35d. Likewise, the puller 36 comprises an arm 36b with an upwardly projecting support 36a and movable forwardly and rearwardly in parallel with the path of transportation of the trays 22, a dog 36d pivoted to the support 36a via a pin 36c extending horizontally and laterally of the trays 22 and a stop 36e fixed to the support 36a so as to limit the pivotal movement of the dog 36d. The intermediate puller 43 comprises an arm 43b with an upwardly projecting support 43a and movable forwardly and rearwardly in parallel with the path of transportation of the trays 22, a dog 43d pivoted to the support 43a via a pin 43c extending horizontally and laterally of the trays 43 and a stop 35e fixed to the support 35a so as to limit the pivotal movement of the dog 35d. The pusher 35 and the pullers 36 and 43 are placed below the path of transportation of the trays 22.

The dog 35d has a push face 35f adapted to abut on a front edge of a square hole 22a at the same position in each tray 22, and a slide face 35g adapted to be guided on a lower face of the tray 22. Movement of the arm 35b in the direction upstream of the transportation of the tray 22 causes the slide face 35g to be guided on and tilted by the lower face of the tray 22 so that the upper end of the dog 35d is fitted into the square hole 22a. Likewise, the dog 36d has a push face 36f adapted to abut on the front edge of the square hole 22a at the same position in each tray 22 as well as a slide face 36g adapted to be guided on the lower face of the tray 22, and movement of the arm 36b in the direction upstream of the transportation of the tray 22 causes the slide face 36g to be guided on and tilted by the lower face of the tray 22 so that the upper end of the dog 36d is fitted into the square hole 22a. In addition, the dog 43d has a push face 43f adapted to abut on the front edge of the square hole 22a at the same position in each tray 22 as well as a slide face 43g adapted to be guided on the lower face of the tray 22, and movement of the arm 43b in the direction upstream of the transportation of the tray 22 causes the slide face 43g to be guided on and tilted by the lower face of the tray 22 so that the upper end of the dog 43d is fitted into the square hole 22a.

To the contrary, movement of the arm 35b in the direction downstream of the transportation of the tray 22 causes pivotal movement of the dog 35d by its own weight in a direction in which the push face 35f contacts the front edge of the square hole 22. The pivotal movement of the dog 35d is limited by the stop 35e so that the tray 22 is pushed downstream in the direction of transportation of the tray 22 depending upon the movement of the arm 35b. Likewise, movement of the arm 36b in the direction downstream of the transportation of the tray 22 causes pivotal movement of the dog 36d by its own weight in a direction in which the push face 36f contacts the front edge of the square hole 22, the pivotal movement of the dog 36d being limited by the stop 36e so that the tray 22 is pushed downstream in the direction of transportation of the tray 22 depending upon the movement of the arm 36b. Movement of the arm 43b in the direction downstream of the transportation of the tray 22 causes pivotal movement of the dog 43d by its own weight in a direction in which the push face 43f contacts the front edge of the square hole 22, the pivotal movement of the dog 43d being limited by the stop 43e so that the tray 22 is pushed downstream in the direction of transportation of the tray 22 depending upon the movement of the arm 43b.

Before starting of the operation of the continuous sintering furnace, push-in load of the pusher 35 at which the column of trays 22 pushed downstream in the direction of transportation lift up in a bridge shape in the furnace body 25 is preliminarily and actually measured as a push interrupt load F0 by load sensing means such as a load cell. Similarly, the push-in load at which the column of trays 22 unbearably leap up to buckle is preliminarily and actually measured as a buckle occurring load F1 (see FIG. 10).

Upon the start of the operation of the continuous sintering furnace, the furnace body 25 is filled with non-oxidizing gas with the doors 28, 29, 41 and 42 being closed into their lowered positions, and the heaters 34 and 44 are operated to heat inside the sintering furnace 25 to a predetermined temperature.

Next, the tray 22 on which the material 1 to be sintered is placed is fed to the deaerating chamber 23; and the door 27 is closed and air inside the chamber 23 is discharged to outside. Then, the door 28 is opened, and the tray 22 is pushed into the preheating zone 37 in the furnace body 25 by the pusher 35, and the door 28 is closed again.

After the lapse of a predetermined time period, following the procedure described above, another tray 22 is pushed from the deaerating chamber 23 into the preheating zone 37 to push the tray or trays 22 already in the latter toward the heating zone 38.

In the above, when the pusher 35 is operated, a push-in load of the pusher 35 is measured by load sensing means such as a load cell.

If the measured value reaches the above-mentioned push interrupt load F0, it means that the column of trays 22 lift up in a bridge shape in the furnace body 25.

As soon as lift-up in the column of the trays 22 is sensed as described above, the operation of the pusher 35 is temporary interrupted and the lift-up of the column of the trays 22 is eliminated, and then the trays 22 are pushed again by the pusher 35.

Figure 10:
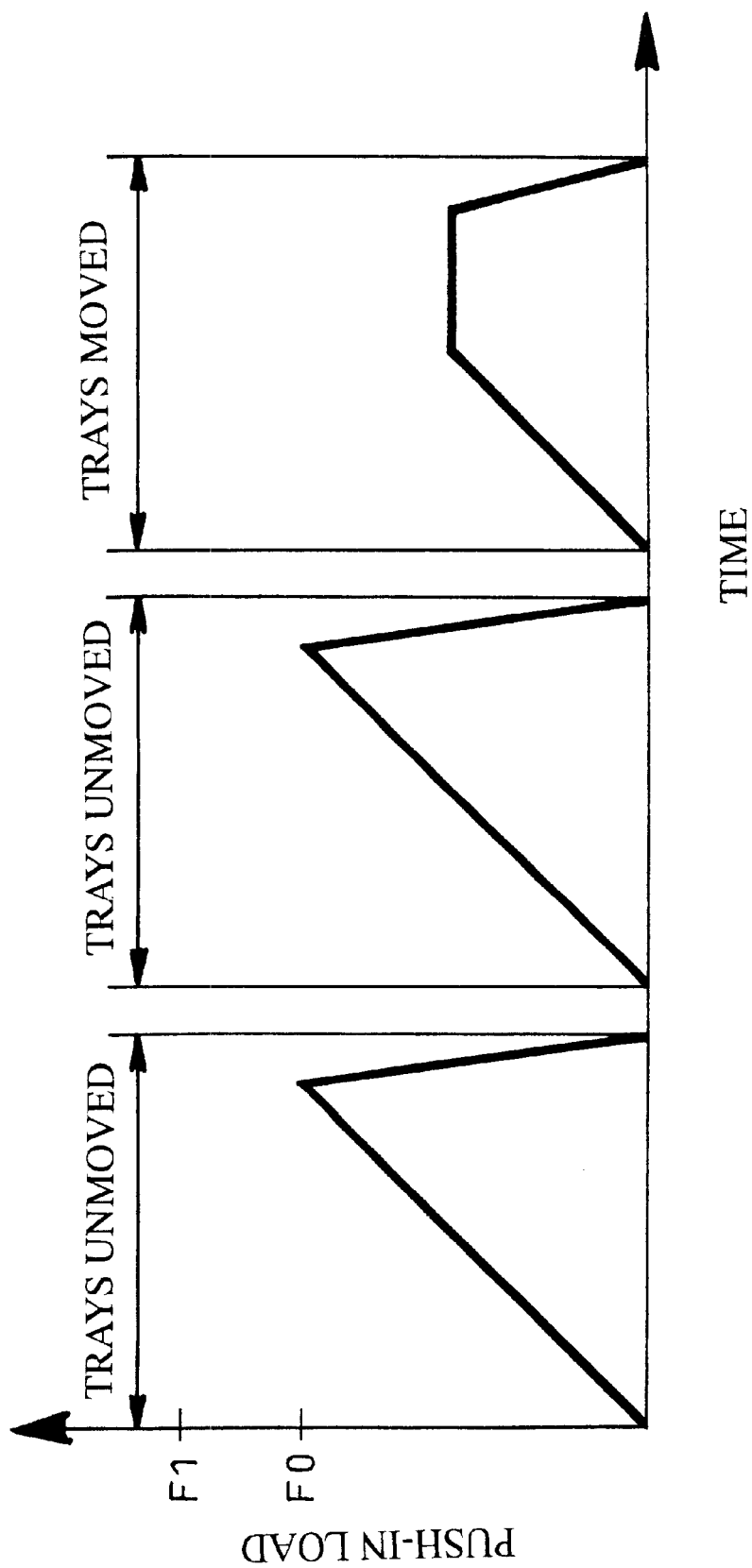
FIG. 10 is a graph showing variation in the push-in load of the pusher in FIG. 4.

When the push-in load of the pusher 35 has reached again the push interrupt load F0, such repetition as shown in FIG. 10 may cause change of conditions of the lift-up of the column of trays 22 such as shift of the lift-up point of the lifted column of trays to thereby eventually make the column of trays 22 advanced depending upon the push-in load of the pusher 35.

The intermediate door 42 is opened when the tray 22 is advanced up to the most downstream end of the heating zone 38 in the direction of transportation by repeating the operation described above. Then, the tray 22 is pulled out from the heating zone 38 to the cooling zone 39 by the intermediate puller 43, and then the intermediate door 42 is closed.

After the lapse of a predetermined time period, following the procedure described above, a succeeding tray 22 is pulled out from the heating zone 38 to the cooling zone 39 to thereby push the trays 22 already in the cooling zone 39 forward or downstream.

Further, when the tray 22 described above is advanced up to the extreme downstream end of the cooling zone 39 in the direction of transportation, the door 29 is opened with the door 30 being closed, and the tray 22 is pulled out from the cooling zone 39 into the deaerating chamber 26; and, after the door 29 is closed, the door 30 is opened and the tray 22 is taken to outside.

Thus, the material 1 to be sintered is gradually raised in temperature over a predetermine time period, heated to a constant temperature in the heating zone 38 for a predetermined time period, and then cooled in the cooling zone 39 over a predetermined time period.

In the heating zone 38 in the furnace body 25, radiant heat energy from the upper heaters 44 is conducted to the material 1 to be sintered from above, radiant heat energy from the lower heaters 34 is conducted from below through clearances between the free rollers 32 and via the tray 22. Thus, the difference in the amount of heat between heats inputted to the material 1 from above and below can be made smaller so that even a lower portion of the material 1 to be heated is sufficiently heated.

In addition, since the tray 22 is supported by the free rollers 32 in a plurality of columns along the length of the furnace body 25, less area of a lower face of the tray 22 is shadowed by the free rollers 32 in contact with the tray 22, thereby improving the conductive efficiency of radiant heat energy to the material 1 to be sintered.

Further, since the heaters 34 and 44 are substantially horizontally and right and left symmetrically disposed in the width direction of the tray 22, uniform temperature distribution in the width direction of the material 1 can be obtained.

Thus, in the continuous sintering furnace shown in FIGS. 4 to 9, movement of the tray 22 from the heating zone 38 to the cooling zone 39 is caused by the intermediate puller 43, and the intermediate door 42 is set at a closed state. Thus, heat input to the cooling zone 39, as well as communication of gas between the heating zone 38 and the cooling zone 39, is prevented, and the cooling zone 39 can be shortened in length to enhance energy efficiency of the entire furnace.

Since the movement of the trays 22 in the preheating and heating zones 37 and 38 is made by the pusher 35, and the movements of the trays 22 from the heating zone 38 to the cooling zone 39 and in the cooling zone 39 are made by the intermediate puller 43, the number of trays 22 to be pushed by the pusher 35 is reduced, and a column of the trays 22 are less likely to lift up and form a bridge.

Further, whether or not the column of trays 22 are in a lift up state is judged based on the judgment whether or not the push-in load of the pusher 35 has reached the push interrupt load F0 grasped in advance. The operation of the pusher 35 is temporary interrupted when push-in load has reached the push interrupt load F0 to eliminate the lift-up of the column of trays 22, and at the same time, various conditions at portions where the lift-up occurred are made to change. Thus, the column of trays 22 can be advanced depending upon the push-in load of the pusher 35.

Figure 12:
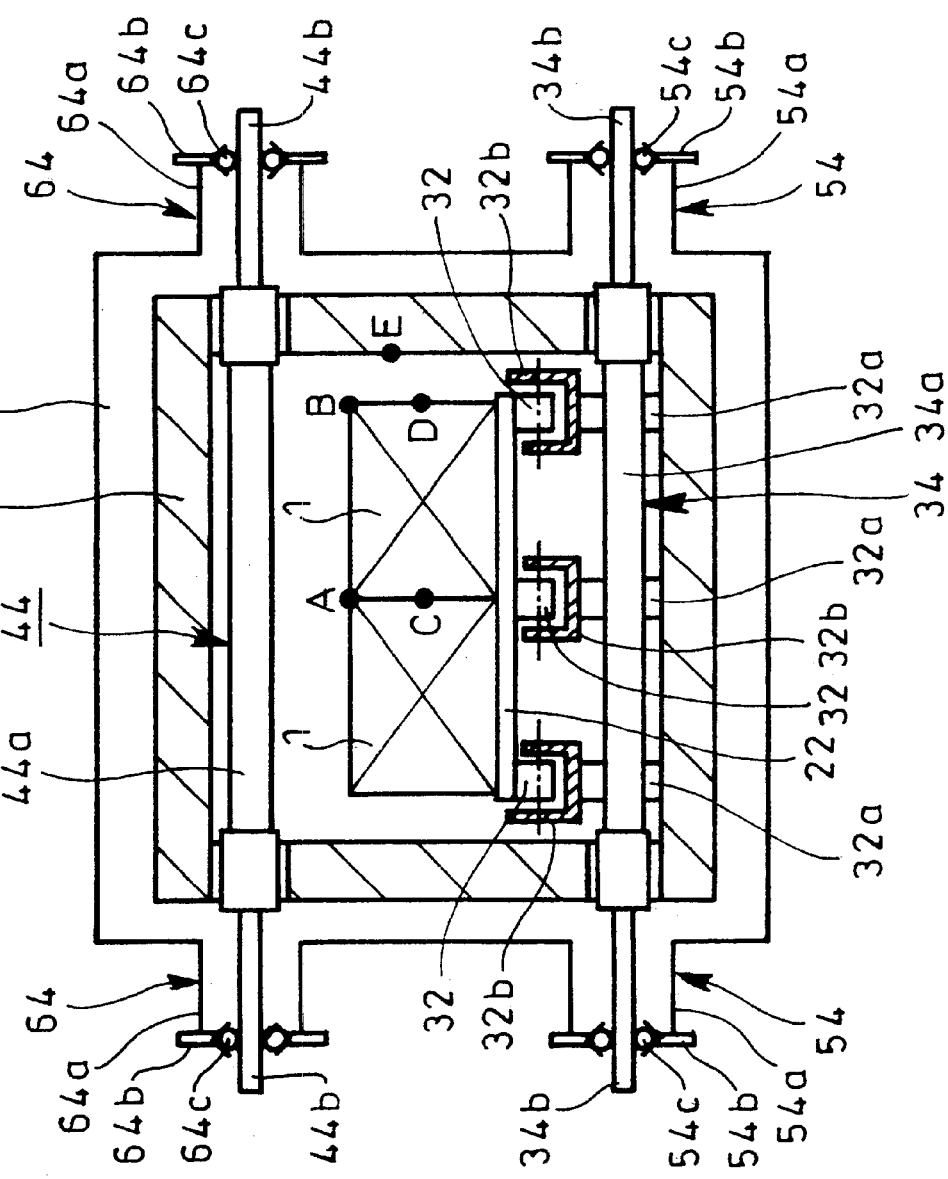
FIG. 12 is a longitudinal section schematically showing the furnace body in FIG. 11.

FIGS. 11 and 12 show a second embodiment of the invention in which parts identical with those in FIGS. 4 to 9 are given the same reference numerals.

The continuous sintering furnace comprises an entrance-side deaerating chamber 23 through which trays 22 may pass, a furnace body 25 in a chamber 24 contiguous with said entrance-side deaerating chamber 23 and through which the trays 22 are sequentially fed from the chamber 23, an exit-side deaerating chamber 26 contiguous with the chamber 24 and through which the trays 22 having passed through the furnace body 25 may pass, a number of free rollers 32 in contact with lower faces of the trays 22 over the whole length of the furnace body and over a range adjacent to a downstream end of the chamber 24 in the direction of transportation of the trays 22, a plurality of lower heaters 34 arranged over a predetermined range in the furnace body 25 so as to be positioned below and between the free rollers, and a plurality of upper heaters 44 arranged over the predetermined range in the furnace body so as to be positioned above a path of transportation of the trays 22.

Two materials 1 to be sintered can be mounted on an upper face of the tray 22 laterally side by side, and a lower face of the tray 22 is smoothly formed.

In the furnace body 25, an entrance-side end for materials 1 to be sintered is located adjacent to the entrance-side deaerating chamber 23, an exit-side end for the materials 1 is located at a distance from the exit-side deaerating chamber 26, and each of cross sectional areas of openings at portions near the entrance- and exit-side ends is made smaller than a cross sectional area of an intermediate portion.

The entrance-side deaerating chamber 23 has vertically movable doors 27 and 28 at its upstream and downstream ends in the direction of transportation of the trays 22, respectively. Likewise, the exit-side deaerating chamber 26 has vertically movable doors 29 and 30 at its upstream and downstream ends in the direction of transportation of the trays 22, respectively.

With the doors 27, 28, 29 and 30 being closed into their lowered positions, air-tightness is maintained in the chambers 23, 24 and 26. With the doors 27, 28, 29 and 30 being opened into their raised positions, the trays 22 are allowed to pass through the chambers 23, 24 and 26.

The free rollers 32 are supported by brackets 32b at upper ends of supporting columns 32a stood on the bottom of the furnace body 25 and the like.

The free rollers 32 are disposed in three columns along the length of furnace so as to contact laterally opposite ends and central portion of a lower face of each tray 22.

In the deaerating chambers 23 and 26, free rollers 31 and 33 having the same support structures as those of the roller 32 are disposed to contact the lower face of the tray 22, respectively.

The lower and upper heaters 34 and 44 are disposed in the intermediate portion (or the portion with a larger cross sectional area) of the furnace body 25. The materials 1 to be sintered are heated by energization of the heaters 34 and 44.

Furthermore, the continuous sintering furnace is equipped with a pusher 35 which pushes the trays 22 one by one into the furnace body 25 from the deaerating chamber 23, a puller 36 which pulls the trays 22 one by one from the furnace body 25 to the deaerating chamber 26 and a fan 21 which agitates non-oxidizing gas in a range in the chamber 24 adjacent to the deaerating chamber 26.

Upon starting of operation of the continuous sintering furnace, the furnace body 25 is filled with non-oxidizing gas with the door 28 and 29 being closed, the heaters 34 and 44 are operated to heat inside the furnace body 25 to a predetermined temperature and the fan 21 is activated.

Next, the tray 22 on which the materials 1 to be sintered are mounted is fed to the deaerating chamber 23; and the door 27 is closed and air in the chamber 23 is discharged to outside. Then, the door 28 is opened, and the tray 22 is pushed into the furnace body 25 by the pusher 35, and the door 28 is closed again.

After the lapse of a predetermined time period, following the procedure described above, another tray 22 is pushed from the deaerating chamber 25 into the furnace body 25 to push the tray or trays 22 already in the latter toward the deaerating chamber 26.

By repeating the operation described above, when the tray 22 is advanced up to the most downstream end of the chamber 24 in the direction of transportation, the door 29 is opened with the door 30 closed. Then, the tray 22 is pulled out from the chamber 24 into the deaerating chamber 26 by the puller 36, the door 29 is closed; and the door 30 is opened with the door 29 being closed, and the tray 22 is moved to the outside.

Thus, the materials 1 to be sintered are gradually raised in temperature over a predetermined time period in the preheating zone 37 in the furnace body 25 adjacent to the deaerating chamber 23, heated to a given temperature for a predetermined time period in the heating zone 38 at the intermediate portion in the furnace body 25, then gradually cooled during a predetermined time period in a gradual cooling zone 40 in the furnace body near the deaerating chamber 26 and in the cooling zone 39 in the chamber 24 which is adjacent to the deaerating chamber 26 at which the fan 21 is installed.

Figure 13:
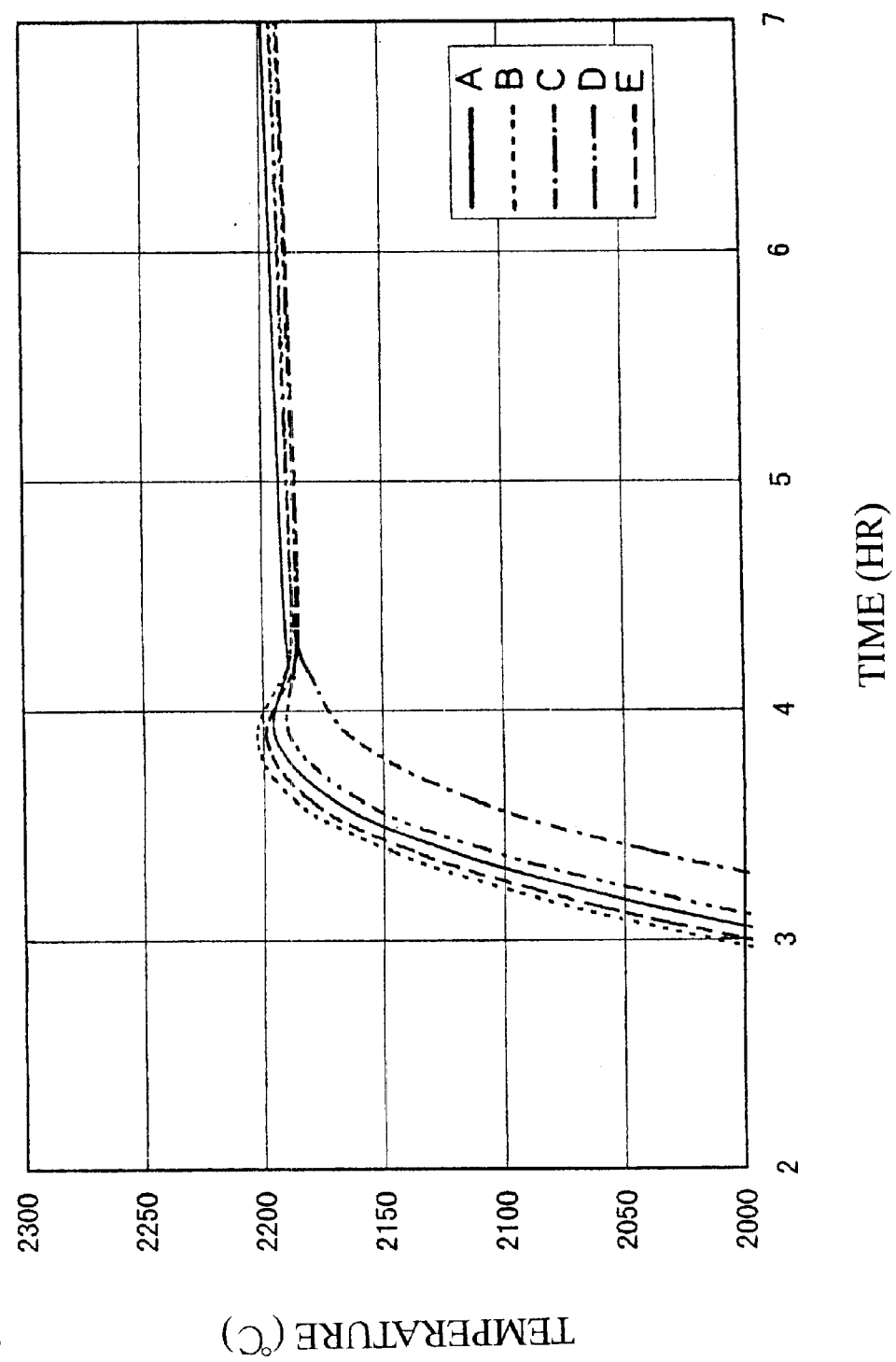
FIG. 13 is a graph showing the relationship between temperature and sintering time with respect to some portions of a work or material and a portion of an inner wall of the furnace body.

FIG. 13 is a graph showing the relationship between temperature and sintering time of portions A, B, C and D of the material 1 to be sintered, and a portion E on an inner wall of the furnace body 25. It will be understood from the graph that about 4 hours and 20 minutes after the starting of the sintering, the temperature differences between the portions A, B, C, D and E become very small (or approximately 6° C. in actual measurement) and that the material 1 is uniformly heated.

More specifically, in the continuous sintering furnace shown in FIG. 11 and 12, radiant heat energy from the upper heaters 44 is conducted to the material 1 from above and radiant heat energy from the lower heater 33 is conducted to the material 1 from below through clearances between free rollers 32 and via the trays 22 so that, by appropriately controlling the upper and lower heaters 44 and 34 independently of each other, the difference in amount of heat between heat inputted to the material 1 from above and that inputted from below can be made smaller. The material to be sintered is sufficiently heated even at its lower portion, thereby improving production yields.

Since the tray 22 is supported by a plurality of columns of free rollers 32 along the length of the furnace, less area of a lower face of the tray 22 is shadowed by the free rollers 32 in contact with the tray 22, thereby improving the conductive efficiency of radiant heat energy to the material 1.

The lower and upper heaters 34 and 44 are disposed substantially horizontally and symmetrically with respect to the path of transportation of the trays, thereby making temperature distribution of the material 1 uniform.

In addition, each of the heating energization bodies 34a and 44a are installed through side walls of the furnace body 25, and the electrodes 34b and 44b on opposite ends of the energization bodies are displaceably supported by the holders 54 and 64. Thus, the difference in thermal expansion between the heaters 34, 44 and the furnace body 25 is absorbed.

It is to be understood that the inventive is not limited to the above embodiments and that various changes and modifications may be made without departing from the scope and spirit of the invention.

What is claimed is:

1. A continuous sintering furnace, comprising:
    an entrance-side deaerating chamber through which trays, each of which has a rectangular hole and is adapted to contain a material to be sintered, are moveable;
    preheating, heating and cooling zones into which the trays are sequentially positionable from said entrance-side deaerating chamber;
    an exit-side deaerating chamber through which the trays having passed through the cooling zone are moveable;
    pusher means for pushing the tray from said entrance-side deaerating chamber to the preheating zone, said pusher means having a first arm adapted to be selectively pushed and pulled and a first dog pivoted to a downstream end of the first arm in a direction of transportation of the trays so that the first dog abuts on and moves away from a downstream edge of the rectangular hole of the tray when the first arm is pushed and pulled, respectively;
    puller means for pulling the tray from the cooling zone to the exit-side deaerating chamber, said puller means having a second arm adapted to be selectively pushed and pulled and a second dog pivoted to an upstream end of the second arm in the direction of transportation of the trays so that the second dog abuts on and moves away from the downstream edge of the rectangular hole of the tray when the second arm is pulled and pushed, respectively;
    intermediate puller means for pulling the tray from the heating zone to the cooling zone, said intermediate puller means having a third arm adapted to be selectively pushed and pulled and a third dog pivoted to an upstream end of the third arm in the direction of transportation of the trays so that the third dog abuts on and moves away from the downstream edge of the rectangular hole of the tray when the third arm is pulled and pushed, respectively;
    a vertically moveable first door moveable between the entrance-side deaerating chamber and the preheating zone;
    a vertically moveable first intermediate door positioned in proximity with said first door and arranged at an upstream end of the preheating zone in a direction of transportation of the trays;
    a vertically moveable second intermediate door moveable between the heating and cooling zones; and
    a vertically moveable second door moveable between the cooling zone and the exit-side deaerating chamber.

2. A continuous sintering furnace according to claim 1, which comprises free roller means for supporting the trays from below and which are arranged in a plurality of columns over substantially an entire length portion of the preheating, heating and cooling zones.

3. A continuous sintering furnace comprising:
    a substantially horizontally arranged furnace body through which a plurality of trays are moveable between opposite ends of the furnace body, said trays being adapted to contain a material to be sintered;
    free roller means for supporting the trays from below which are arranged in a spaced apart relationship over substantially an actual length portion of said furnace body; and
    a plurality of lower heaters arranged over a predetermined range in the furnace body so as to be positioned below and between the free roller means and a plurality of upper heaters arranged over the predetermined range in the furnace body so as to be positioned above a path of transportation of the trays;
    wherein the free roller means are arranged in a plurality of columns along a predetermined length of the furnace body.

4. A continuous sintering furnace comprising:
    a substantially horizontally arranged furnace body through which a plurality of trays are moveable between opposite ends of the furnace body, said trays being adapted to contain a material to be sintered;
    free roller means for supporting the trays from below which are arranged in a spaced apart relationship over substantially an actual length portion of said furnace body; and a plurality of lower heaters arranged over a predetermined range in the furnace body so as to be positioned below and between the free roller means and a plurality of upper heaters arranged over the predetermined range in the furnace body so as to be positioned above a path of transportation of the trays;

wherein each of the lower and upper heaters comprises a heating energization body having electrodes positioned on opposite ends thereof, said heating energization body extending through side walls of the furnace body substantially horizontally and laterally of the trays, and holders which support said electrodes.

5. A method for operating a continuous sintering furnace, which comprises:

moving a plurality of trays containing a material to be sintered through an entrance side of a deaerating chamber;

sequentially feeding the trays through preheating, heating and cooling zones of the furnace from said entrance-side deaerating chamber;

pressing the trays into an exit-side deaerating chamber from the cooling zone;

utilizing pusher means for pushing the tray from said entrance-side deaerating chamber to the preheating zone, puller means for pulling the tray from the cooling zone to the exit-side deaerating chamber, intermediate puller means for pulling the tray from the heating zone to the cooling zone, a vertically moveable first door moveable between the entrance-side deaerating chamber and the preheating zone, a vertically moveable first intermediate door positioned in proximity with the first door and positioned at an upstream end of the preheating zone in a direction of transportation of the trays, a vertically moveable second intermediate moveable door between the heating and cooling zones and a vertically moveable second door moveable between the cooling zone and the exit-side deaerating chamber; and moving a tray of said plurality of trays at an extreme downstream position in the heating zone in the direction of transportation of the trays into the cooling zone by the intermediate pusher, upon the second intermediate door being at a raised position thereof for opening, so as to push the trays already in the cooling zone downstream and subsequently moving the intermediate door into a lowered position thereof for closing.

6. A method for operating a continuous sintering furnace according to claim 5, which further comprises:

preliminarily gripping a push-in load of the pusher means at which the trays in a column pushed downstream in the direction of transportation lift-up in a bridge shaped manner during a push interrupt load occurrence; and upon a push-in load of the pusher means reaching the push interrupt load during pushing of the trays downstream in the direction of transportation, temporarily interrupting operation of the pusher means for avoiding lifting-up of the column of trays, and resuming pushing of the trays.

7. A continuous sintering furnace comprising:

a substantially horizontally arranged furnace body through which a plurality of trays are moveable between opposite ends of the furnace body, said trays being adapted to contain a material to be sintered;

free roller means for supporting the trays from below which are arranged in a spaced apart relationship over substantially an actual length portion or said furnace body; and a plurality of lower heaters arranged over a predetermined range in the furnace body so as to be positioned below and between the free roller means and a plurality of upper heaters arranged over the predetermined range in the furnace body so as to be positioned above a path of transportation of the trays, wherein each of cross sectional areas of openings at portions near the entrance- and exit-side ends in the furnace body is made smaller than a cross sectional area of an intermediate portion in the furnace body.

* * * * *